March 22, 1955  J. L. WEBB  2,704,478
SLIDABLE JAW WRENCH
Filed Sept. 1, 1953
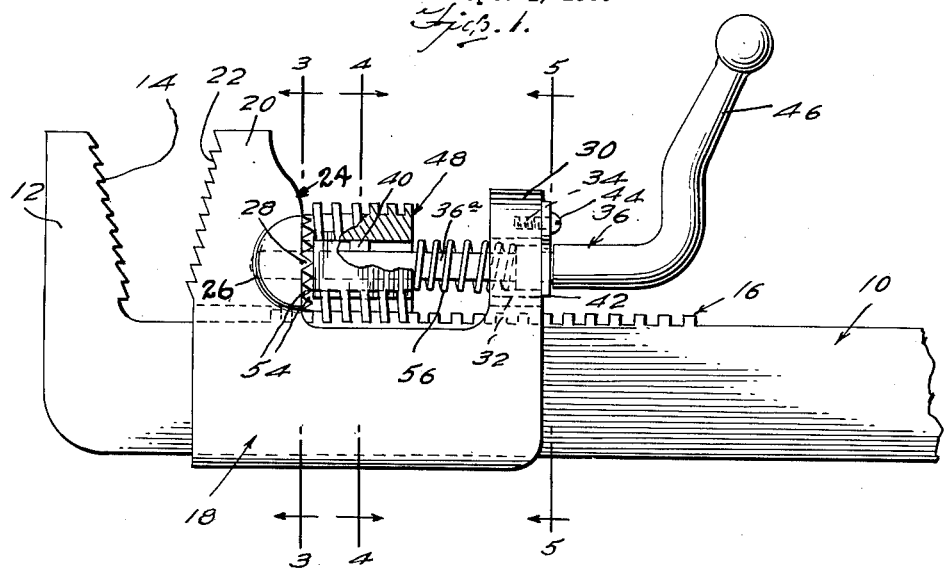
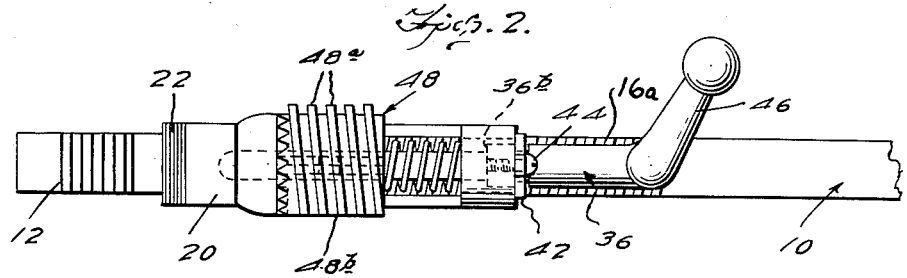
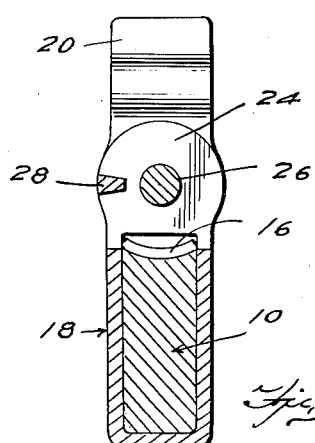 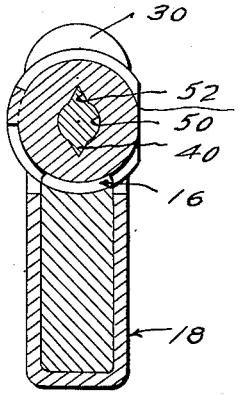 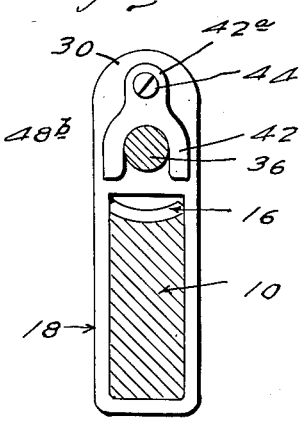
Inventor
James L. Webb
By Wilfred J. Lawson
ATTY.

UNITED STATES PATENT OFFICE 2,704,478
Patented Mar. 22, 1955

2,704,478

SLIDABLE JAW WRENCH

James L. Webb, Gainesville, Tex., assignor of one-fourth to Carroll F. Sullivan and one-fourth to J. O. Thompson, both of Gainesville, Tex.

Application September 1, 1953, Serial No. 377,785

1 Claim. (Cl. 81—159)

This invention is directed to improvements in tools and relates to improvements in wrenches.

An object of the present invention is to provide an improved quick adjustable wrench whereby the jaws can be given a quick preliminary setting against the work and then forced to tightly grip the work by a lever means, with a novel means whereby reverse movement of the operating lever can be effected to a predetermined extent to allow for a quick opening of the jaws.

Another object of the invention is to provide a quick setting wrench employing a screw nut and rack wherein the nut is provided with a blank portion designed to receive the teeth of the rack to permit the screw and the attached shiftable jaw to be backed off or moved forward for a rough adjustment of the jaws or for the release of the work, a novel coupling being provided between the screw nut and the movable jaw, whereby upon rotation of the nut in one direction the movable jaw will be forced forwardly and upon rotation of the nut in the reverse direction, the nut is permitted to back off from the movable jaw until the blank space on the nut is brought into register with the rack teeth to thereby permit the quick opening of the jaws.

The invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawing:

Figure 1 is a view partly in side elevation and partly in section of a wrench constructed in accordance with the present invention.

Figure 2 is a view looking toward the front or face of the wrench.

Figure 3 is a transverse section taken substantially on the line 3—3 of Figure 1, the section being on an enlarged scale.

Figure 4 is a transverse section, on an enlarged scale, taken substantially on the line 4—4 of Figure 1.

Figure 5 is a sectional view, on an enlarged scale, taken substantially on the line 5—5 of Figure 1.

Figure 6 is a view in perspective of the forward end portion of the shaft, showing the nut engaging lugs.

Referring now more particularly to the drawing the numeral 10 generally designates the handle shank of the wrench on the forward end of which is formed the fixed jaw 12, having upon the inner face the work engaging teeth 14.

The top or front edge of the shank 10 is formed to provide a toothed rack 16, the teeth of which are designated 16a.

Enclosing the shank 10 is the elongate runner sleeve which is generally designated 18 which carries upon its forward end the movable jaw 20 having the toothed face 22 which is in opposed cooperative relation with the teeth 14 of the fixed jaw.

The rear or back face of the movable jaw 20 is formed to provide the rearwardly facing shoulder 24, here shown as being of circular form and in the center of this shoulder is formed a socket 26 and adjacent to the outer edge of the shoulder there is formed a single V-tooth 28.

At the opposite end of the runner sleeve 18 there is formed the upstanding post 30 which is in spaced relation with the shoulder 24 and which has formed therethrough the passage 32 which is in alignment with the socket 26.

Upon the rear side of the post 30 there is formed in the post outwardly from the passage 32, a threaded bore 34 for the purpose hereinafter set forth.

The numeral 36 designates a shaft which has an elongate forward end portion 36a of reduced diameter and which is provided, adjacent to the reduced portion, with the encircling channel 38.

Adjacent to the forward end of the reduced portion 36a of the shaft there are formed, upon diametrically opposite sides of the shaft, the V-lugs 40 for the purpose hereinafter set forth.

As shown in Figure 1 the reduced portion 36a of the shaft 36 extends through the passage 32 in the post 30 and has its forward end seated in the socket 26. The annular channel 38 is then positioned adjacent to the outer or rear face of the post 30 and receives the forked key 42 which has an apertured ear portion 42a which is positioned in line with the threaded hole or passage 34 to receive a securing screw 44 which is threaded into the hole 34. The shaft 36 is held in position for rotation between the movable jaw 20 and the post 30 as illustrated and it is in spaced relation with the teeth of the rack 16.

The rear end of the shaft 36 is extended at an angle to form the lever 46 by means of which the shaft is turned as hereinafter set forth.

Mounted upon the reduced portion 36a of the shaft 36, between the movable jaw 20 and the post 30 is the cylindrical nut 48 having an external spiral thread 48a for engagement with the teeth 16a of the rack.

The thread of the nut 48 is interrupted, as at 48b so that, when the nut is rotated to the proper position, it will allow free sliding movement of the runner sleeve and parts carried thereby on the shank of the tool.

The nut 48 has a central or axial passage 50 therethrough which receives the portion 36a of the shaft and this passage is also provided in opposite sides of the wall with the V-channels 52 in which are slidably received the lugs 40.

On the forward end of the nut 48 there are formed around the opening 50 radial ratchet teeth 54 with which the single ratchet tooth 28 on the shoulder 24 engages.

Interposed between the nut 48 and the post 30, and encircling and supported on the portion 36a of the shaft 36, is an expansion spring 56 which opposes the movement of the nut away from the shoulder 24, one end of the spring bearing against the adjacent end of the nut, while the other end of the spring enters the aperture 32 and bears against the shoulder 36b which is formed at the back end of the reduced portion 36a of the shaft.

In the operation of the tool the setting of the same to fit any size pipe or other object is controlled by the lever 46. By turning the lever and the screw nut 48 until the flat or blank portion 48b is opposed to the rack teeth 16a the nut is free from the rack as previously stated, so that the entire assembly can be moved on the handle shank 10 forward or backward as may be desired. After the jaws 12 and 20 have been set to the work a slight turn to the right of the lever 46 will turn the nut 48 to bring the threads 48a into engagement with the rack teeth 16a and a further turn of the nut by the lever will then apply the desired pressure of the jaws to the work.

The spring 56 keeps the screw nut 48 pressed forward against the shoulder 24 and serves only to hold the nut in place until pressure is put on the jaws of the wrench. The nut is firmly locked until reverse rotation is given the shaft whereupon the spring will yield sufficiently to allow the tooth 28 and the ratchet teeth 54 to slip past one another, thereby releasing the jaws.

I claim:

In a slidable jaw wrench, an elongate handle shank, a fixed jaw carried on one end of said shank, rack teeth formed along the inner edge of said shank, an elongate runner on the shank, a movable jaw carried on an end of the runner nearest the fixed jaw, a post carried by the opposite end of said runner, a rotatable shaft extending inwardly through the post and having its inner end journaled in said movable jaw, the shaft extending at one end through the post, a cylindrical nut having an external spiral thread slidably supported on the shaft adjacent to the movable jaw for engagement with said teeth, means keying the nut to the shaft to prevent its turning thereon, said thread being interrupted by a blank area for freeing the thread from the rack teeth when turned to one position, a ratchet tooth coupling between an end of the nut and the movable jaw, a coil spring on said shaft between the post and said nut urging the nut toward the movable jaw to keep said ratchet teeth engaged, said shaft having a circumferential channel at the outer side of said post, a forked key straddling said shaft and engaged in said channel to prevent endwise movement of the shaft, and a crank carried by the outer end of said shaft for rotating the same and nut.

References Cited in the file of this patent

UNITED STATES PATENTS

| | | |
|---|---|---|
| 627,950 | Zeigler | June 27, 1899 |
| 761,798 | Walden | June 7, 1904 |
| 763,226 | Walden | June 21, 1904 |
| 1,364,577 | Myers | Jan. 4, 1921 |
| 1,498,656 | Herby | June 24, 1924 |

FOREIGN PATENTS

| | | |
|---|---|---|
| 547,018 | France | Sept. 9, 1922 |